United States Patent
Backe

(10) Patent No.: US 8,440,940 B2
(45) Date of Patent: May 14, 2013

(54) PHOTOVOLTAIC ICE DAM REMEDIATION APPARATUS

(76) Inventor: Richard Backe, Glenwood Springs, CO (US)

( * ) Notice: Subject to any disclaimer, the term of this patent is extended or adjusted under 35 U.S.C. 154(b) by 540 days.

(21) Appl. No.: 12/661,969

(22) Filed: Mar. 26, 2010

(65) Prior Publication Data

US 2011/0232210 A1   Sep. 29, 2011

(51) Int. Cl.
*E04D 13/18* (2006.01)

(52) U.S. Cl.
USPC .......................................... 219/213; 52/173.3

(58) Field of Classification Search .................. 219/213; 52/173.3
See application file for complete search history.

(56) References Cited

U.S. PATENT DOCUMENTS

| | | | |
|---|---|---|---|
| 4,252,183 A | 2/1981 | Ricciardelli | |
| 4,261,417 A | 4/1981 | Tingley | |
| 4,291,673 A | 9/1981 | Deutz | |
| 4,333,444 A | 6/1982 | Sell | |
| 4,335,299 A | 6/1982 | Belohlavek | |
| 4,432,341 A | 2/1984 | Howe | |
| 4,763,450 A | 8/1988 | Daniel | |
| 5,368,654 A | 11/1994 | Bergevin | |
| 5,746,027 A | 5/1998 | Bonerb | |
| 5,887,584 A | 3/1999 | Smith | |
| 5,890,324 A | 4/1999 | Maanum | |
| 5,930,457 A | 7/1999 | Torangeau | |
| 6,093,885 A | 7/2000 | Takehara | |
| 6,166,352 A | 12/2000 | Turton | |
| 6,225,600 B1 | 5/2001 | Burris | |
| 7,051,480 B1 | 5/2006 | Dennis | |
| 7,071,446 B1 * | 7/2006 | Bench | 219/213 |
| 2009/0014057 A1 * | 1/2009 | Croft et al. | 136/248 |
| 2010/0089433 A1 * | 4/2010 | Conger | 136/244 |
| 2010/0236608 A1 * | 9/2010 | Ball et al. | 136/251 |

OTHER PUBLICATIONS

Thermal Technologies, "Installation Guide—Heat Trace Wire" date unknown, available on Internet.
Heatline, Kompensator series heating cable specification sheet, date unknown, available on Internet.

* cited by examiner

*Primary Examiner* — Marc Armand
(74) *Attorney, Agent, or Firm* — John C. Janka

(57) ABSTRACT

An ice dam remediation apparatus comprises a photovoltaic cell panel DC power source (9) directly connected electrically to a low-voltage electrical heat tape or wire cable (8). The heat tape or wire cable (8) is arranged near the eave (6) of a rooftop (2) in an orientation that will create a plurality of runoff channels or tunnels (11) through the ice or snow covering the roof. The channels or tunnels (11) are oriented along the dip of the rooftop, thus permitting water to drain off the edge (6) of the rooftop (2) instead of freezing and contributing to the formation of an ice dam along the edge (6) of the rooftop (2). Preferably, the photovoltaic cell (9) is situated on a sunny roof surface (3), so as to provide maximum power to the heat tape or wire cable (8), which is situated on a shady portion (2) of the roof, where ice dam formation is most likely.

12 Claims, 6 Drawing Sheets

PHOTOVOLTAIC ICE DAM REMEDIATION APPARATUS

BACKGROUND OF THE INVENTION

1. Field of the Invention

The invention relates to an electrically-heated ice dam remediation apparatus for preventing or ameliorating the formation of ice dams on roofs; in particular to a device powered by pholtovoltaic cells directly connected electrically to a heat tape or wire cable arranged along the roof edge in an orientation which creates and maintains open channels in the ice or snow along the eaves, permitting water to drain off the edge of the roof.

2. Description of the Prior Art

In areas which experience significant amounts of snow, the formation of ice dams on roofs is a common problem. After a snowstorm, snow on the roof tends to melt in relatively warm areas of the roof, causing water to run down the dip or slope of the roof towards the eave. The runoff water tends to freeze along the eave, creating an ice dam, an irregular sheet or ridge of solid ice which increasingly obstructs further flow of water and so leads to accumulation of still more ice along the edge of the roof and particularly in shaded areas and in angles of the roof. In this way ice dams many inches thick may be created over the course of several snowstorms. Such ice dams are subject to alternate freezing and thawing, which physically damages the roof surface and the eaves and which also creates gaps and cracks through which water can flow under the shingles or other roof surface material and into the building. In addition, ice dams spawn icicles, which often grow to sizes that present a danger to passersby when the icicles break loose and fall.

Ice dams form most persistently in roof areas which are partially or completely shaded from direct sunlight. In the Northern Hemisphere, north- and east-facing roof surfaces and edges are most subject to the formation of ice dams; as are roof surfaces which are permanently shaded from direct sunlight by other structures, trees or the like.

Electrical heat tape or wire cable powered by house current is commonly used to heat portions of the roof subject to ice dam formation. Typically, 110 volt AC power is applied to heat tape or wire cable installed so as to cover a substantial portion of the entire roof edge; such installations must be grounded (and so require installation by a certified electrician). In addition to the fire and shock hazard posed by such arrangements, they use substantial amounts of costly electrical power, in part because they are typically powered up continuously, day and night, even though night-time temperatures are often so low that it is not possible to melt snow and ice even with heat tape or wire cable. Power usage for such systems on residential structures often exceeds 1000 Kw-hrs per month.

Some installations of this general type may use low-voltage heat tape or wire cable powered by a transformer, which in turn uses 110 volt house current. See, for example, U.S. Pat. No. 7,071,446 B1 (Bench). But, such arrangements still use expensive purchased electric power; they typically require installation by licensed electricians, and in addition they may require voltage or temperature regulation control systems which, along with the transformer, further add to the installed cost.

A number of patents disclose a variety of solar-heated devices which are intended to create and maintain open slots, tunnels or channels through ice dams, and so prevent or ameliorate the problems caused by ice accumulation. See, e.g., U.S. Pat. No. 4,333,444 (Sell); U.S. Pat. No. 4,252,183 (Ricciardelli) and U.S. Pat. No. 4,261,417 (Tingley). Such devices are not electrically powered but instead depend upon conduction of solar heat, usually via a metal structure, directly to the area of ice damming. As a result, they are unsuitable (or at best only marginally usable) for shaded roof areas which are most subject to ice dam formation. And although heat pipes can be used to conduct heat to an area of ice dam formation, as in Tingley '417, such heat pipes typically require a straight run (no bends or corners) and have very limited lengths.

U.S. Pat. No. 6,093,885 (Takehara) describes a photovoltaic power generating system in which snow falling on the photovoltaic cells themselves is said to be melted off using electrical heat. The electrical heat is generated by applying a voltage from an external power source to the solar cells themselves. Because of this arrangement, snow melting normally must be done at night with this device; and substantial electrical power from some source other than the photovoltaic cells themselves is required. Moreover, situating photovoltaic cells directly on a roof edge area subject to ice dam formation would damage or destroy the cells. U.S. Pat. No. 5,368,654 (Bergevin), which teaches modifications to a photovoltaic structure intended to trap heat energy directly, would suffer from this drawback as well.

SUMMARY OF THE INVENTION

The objects of this invention are to provide an electrically-heated ice dam remediation apparatus which does not require external electric power; which is inherently safe and accordingly does not require installation by a licensed electrician; and which will effectively prevent or ameliorate ice dams on shaded roof areas where ice dams are most likely to form.

These objects are attained by providing an apparatus made by: (1) affixing a photovoltaic cell DC power source to a portion of the roof or other building structure which provides the best exposure to sunlight in winter; (2) providing a direct electrical coupling between the photovoltaic cell output and an electrical heat tape or wire cable—that is, no modulation of the DC electrical power supply to the heat tape; (3) employing low-voltage (typically 12 volt) DC power directly from the photovoltaic cell to ameliorate electrical shock hazard and to obviate any need for grounding; (4) situating the electrical heat tape or wire cable on shaded portions of roof edges most prone to accumulation of ice dams; and (5) creating a physical arrangement of line segments of the electrical heat tape or wire cable in an orientation more or less perpendicular to the edge of the roof, so as to melt channels or maintain open channels through ice and snow on the roof, permitting water to drain off the roof.

DETAILED DESCRIPTION OF SPECIFIC EMBODIMENTS

Figure 1:
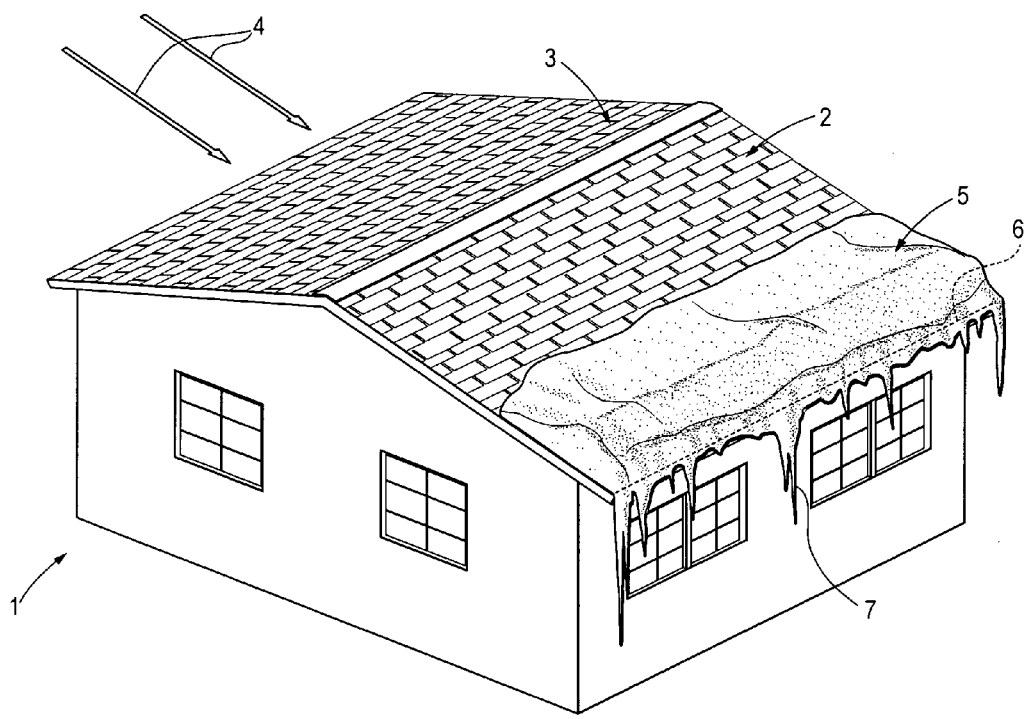
FIG. 1 is a perspective view of a building, showing the location where an ice dam is most likely to form.

FIG. 1 illustrates a building structure 1 having a generally shaded roof surface 2 and a roof surface 3 which is most exposed to incident solar radiation 4. (In the Northern Hemisphere, the shaded roof surface 2 will generally be north- and east-facing, while the sunny roof surface 3 usually will face in a more southerly and westerly direction.) An ice dam is most likely to form in the area 5 along, and covering, the edge 6 of the shaded roof surface 2. After a series of snowstorms, icicles 7 often form below the area 5 of probable ice dam formation. Because of the building orientation, incident solar radiation 4 is insufficient to melt the ice dam 2.

Figure 2:
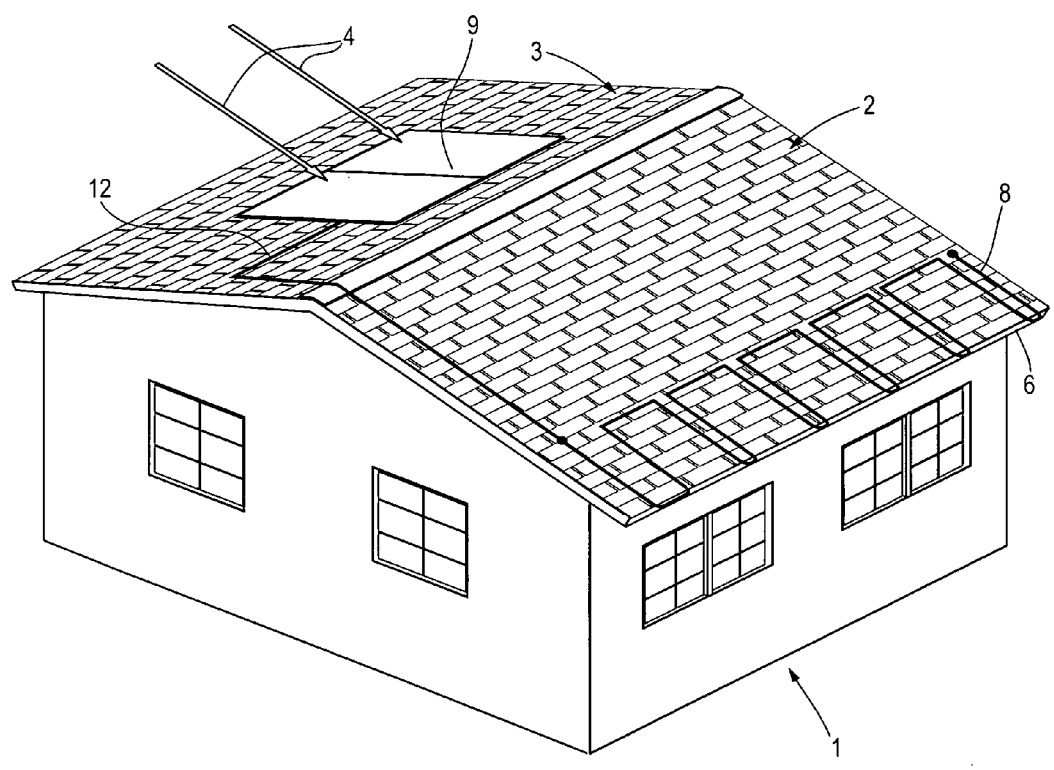
FIG. 2 shows installation of a photovoltaic cell in a location which provides optimum exposure to sunlight, while powering a heat tape or wire cable in a remote, shaded location of a roof edge which is prone to ice dam formation.

FIG. 2 illustrates how the low voltage heat tape or wire cable 8 of the present invention is preferably arranged above the edge 6 of the shaded roof surface 2. The low voltage heat tape 8 operates preferably between about 6 volts and about 30 volts, and is electrically connected to a photovoltaic cell 9, which is preferably located on the sunny roof surface 3, remotely from the heat tape 8, which is situated in the area of likely ice dam formation 5. This provides maximum electrical power for the low voltage heat tape despite the location of the heat tape in a shaded area 2 of the roof. The heat tape or wire cable 8 of the present invention is generically referred to herein as "heating cable." It is connected to the photovoltaic cell 9 by electrical connection 12.

A wide range of commercially-available low voltage heat tape or wire cable is suitable for use with the present invention. One example is "Kompensator" series KHL 123-25 self-regulating 12 volt heating cable, manufactured by the HeatLine division of the Christopher MacLean Company of Carnarvon, Ontario, Canada. On non-conductive roofs, bare metal Nichrome resistance wire may be used if desired. Such wire may be electrically insulated, if desired. Prefabricated panels with built-in electrical heating elements also may be used; such panels are commercially available to fit in roof valleys or along eaves. One supplier of such panels is Thermal Technologies Co. of Bluffdale, Utah. Use of panels may require connection of multiple photovoltaic panels in series to achieve voltages higher than 12 volts, depending upon temperature conditions where the installation is made.

A number of companies sell photovoltaic panels suitable for roof mounting and for use in the present invention. Among these are Sharp Electronics Corporation of Huntington Beach, Calif., a U.S. subsidiary of Sharp Corporation of Osaka, Japan, which manufactures a model ND-224U1F solar panel suitable for use in the present invention. Another such panel is the model CSI CS6P-220 e-module, manufactured by CanadianSolar corporation of Kitchener, Ontario, Canada.

Figure 3:
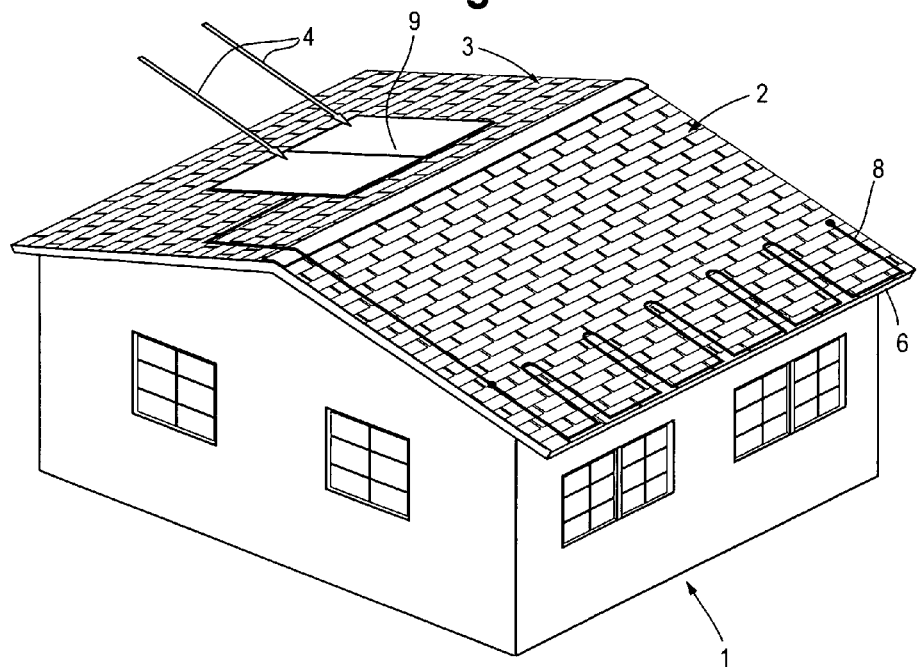
FIG. 3 illustrates one arrangement of heat tape or wire cable to create channels or tunnels through snow or ice, facilitating water runoff.
Figure 4:
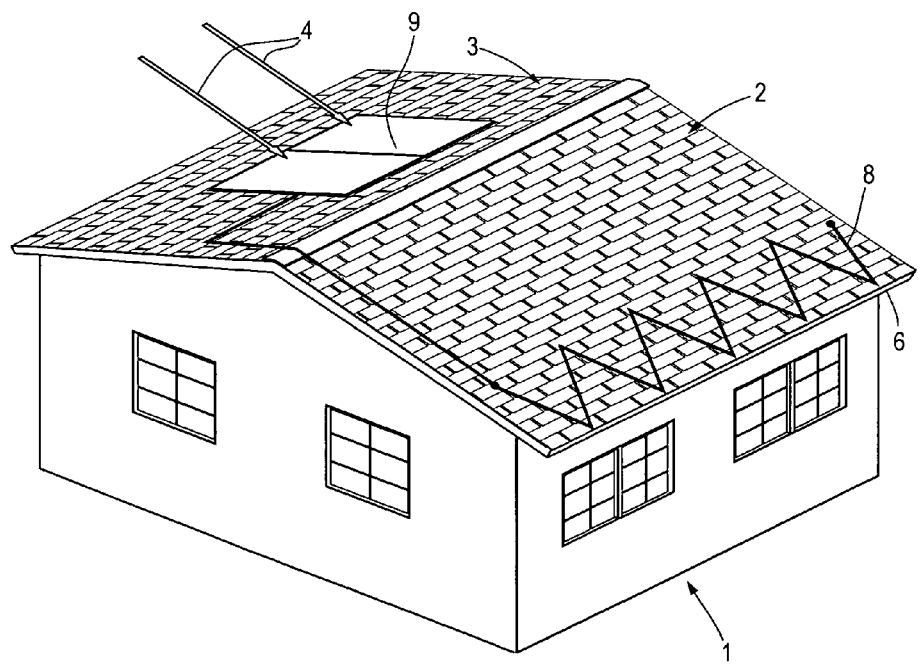
FIG. 4 illustrates another, alternate arrangement of heat tape or wire cable to create channels or tunnels through snow or ice, facilitating water runoff.

Referring again to FIG. 2, one arrangement of heat tape or wire cable 8 is shown. In this arrangement, heat tape or wire cable 8 is affixed to the roof 2 in a series of U-shaped patterns, providing a plurality of downward-pointing lines of heating, each of which comprises substantially parallel lines 10 of heat tape or wire cable arranged roughly perpendicular to the edge 6 of the roof. As shown in FIG. 2 through FIG. 4, the bottom ends of the heat tape or wire loops in such U-shaped patterns preferably extend past the edge of the roof for a distance of about ⅛ inch to about 1 inch.

FIG. 3 illustrates a variation of the arrangement of FIG. 2, in which the roughly perpendicular lines 10 of heat tape or wire cable are connected together near the roof edge 6 instead of well above the roof edge, as in the arrangement of FIG. 2.

FIG. 4 shows yet another arrangement of heat tape or wire, in which the heat tape or wire is arranged in a zig-zag pattern along the edge of the roof.

Figure 5:
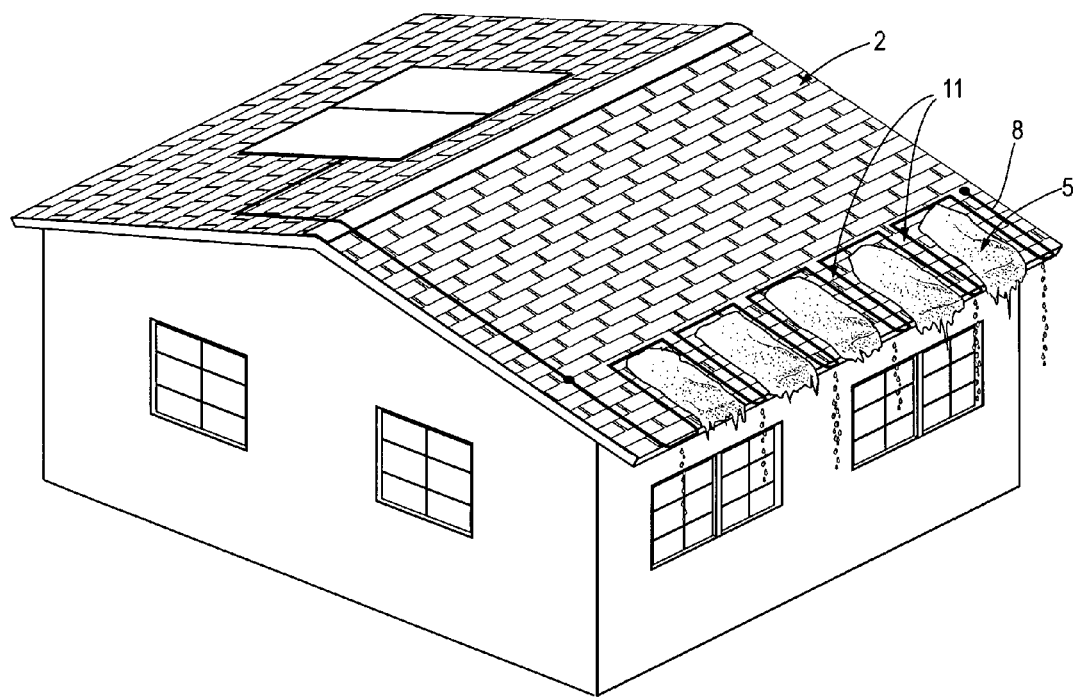
FIG. 5 shows runoff channels formed in an area of ice and snow buildup in an orientation roughly perpendicular to the roof edge by the present invention.

For the embodiments of FIG. 2 through FIG. 4, the result is shown in FIG. 5. In operation, the heat tape or wire cable 8 creates and maintains channels 11 in the snow and ice covering the roof in the area 5 of ice dam formation. This permits water to drain off the edge of the roof, preventing or minimizing formation of an ice dam. In the case of the zig-zag arrangement of FIG. 5, the channels 11 will be aligned at an angle to the dip of the roof rather than along the dip of the roof.

Figure 6:
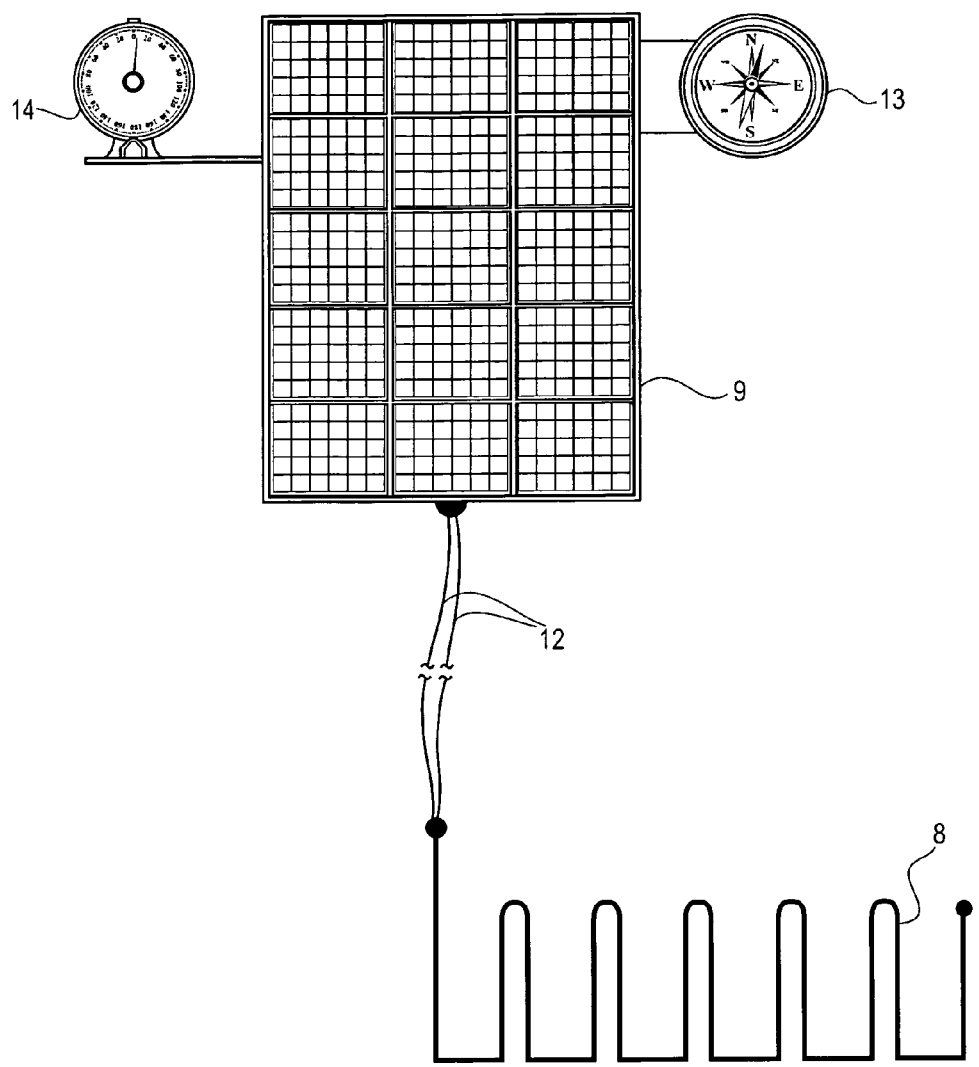
FIG. 6 illustrates direct electrical connection between a photovoltaic cell and a heat tape or wire cable, without modulation of the DC power output of the photovoltaic cell.

Referring now to FIG. 6, the preferred, direct electrical connection between the photovoltaic cell 9 and the heat tape or wire cable 8 is shown. Preferably a simple two-wire connection 12 is used, without any modulation of the DC current output from the photovoltaic cell 9. During the winter season, this electrical connection remains permanently in place; there is no need to switch off the current from the photovoltaic cell to the heat tape or wire cable. Such a direct, unswitched electrical connection is especially preferred where self-regulating heating cable is used to provide overtemperature protection. If desired, a simple on-off switch or timer may be used to turn off the apparatus during summer months by breaking the electrical connection 12 between the photovoltaic cell 9 and the heat tape or wire 8. A simple compass 13 and may be attached to the photovoltaic cell to facilitate orienting the photovoltaic cell in the direction of maximum solar radiation. Similarly, a simple inclinometer 14 may be attached to facilitate positioning the photovoltaic cell at the optimum vertical angle for the specific north (or south) latitude of the structure.

Figure 7:
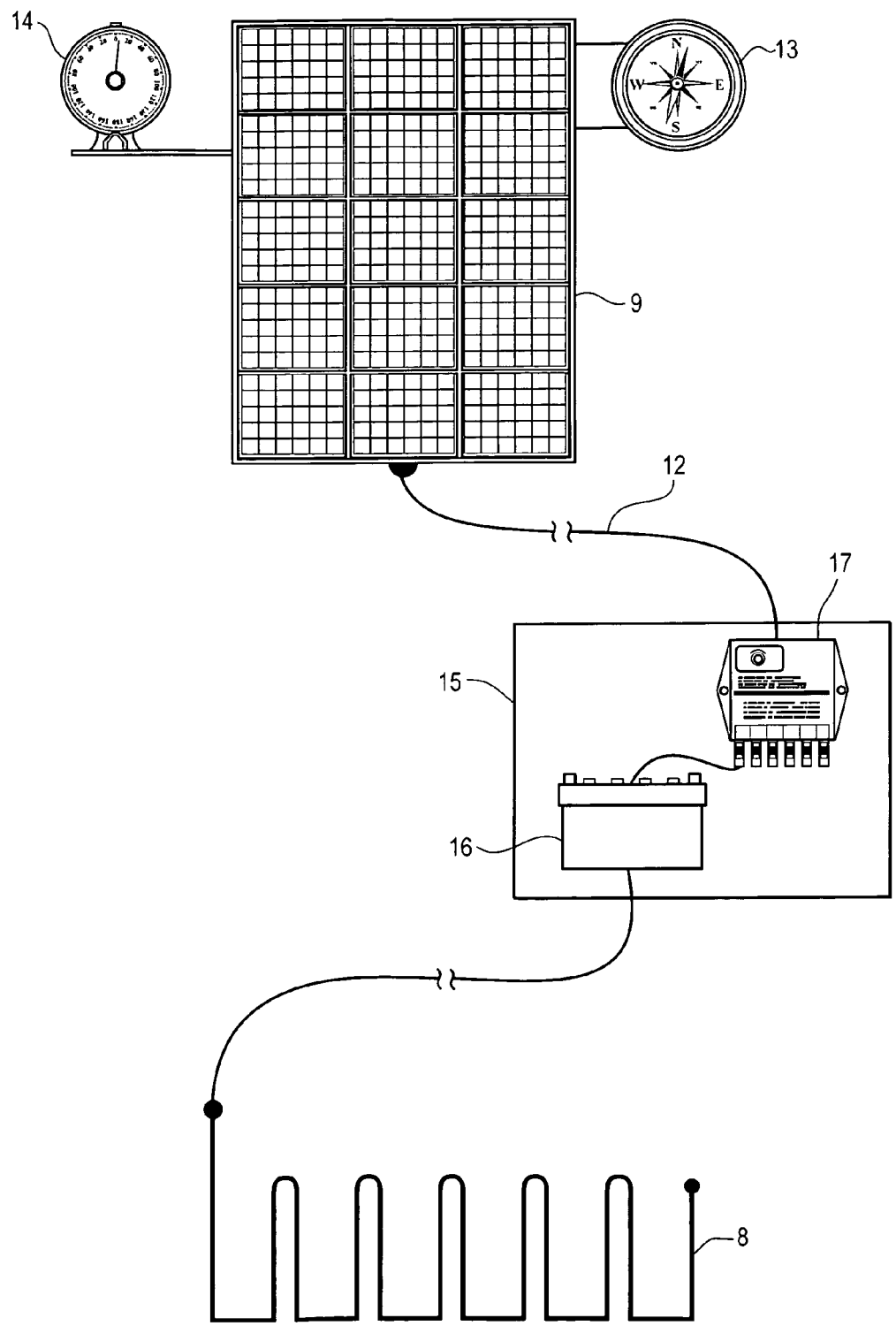
FIG. 7 illustrates an alternate arrangement of circuitry, in which an optional battery storage device 14 is added.

FIG. 7 illustrates an alternate arrangement of circuitry, in which a battery storage device 15 (which includes a storage battery 16 and a charge controller 17) is operatively attached to electrical connection 12 so as to provide electrical power storage for operation of heating tape or wire 12 during periods of low or no sunlight. If desired, provisions also may be made to include an inverter to produce nominal 110-volt or 220-volt AC current, which may be sold to local electrical utilities in some areas of the country during seasons of the year when ice dam remediation is not necessary.

For a typical residential installation, a 70 foot long, 12 volt heating tape consuming 3 watts per lineal foot of DC electrical power may be used. A 210 watt nominal capacity photovoltaic cell panel may be employed. As shown in FIG. 2, by positioning the photovoltaic cell 9 in an optimum location on a sunny roof surface or elsewhere in sunlight, and electrically connecting the photovoltaic cell 9 to the heat tape or wire cable 8 by means of electrical connection 12, maximum power is available to the heat tape or wire cable 8 even though it is situated on a shaded portion 2 of the roof.

In such a typical residential installation with the arrangements shown in FIG. 3 or FIG. 4, the roughly perpendicular lines 10 of heat tape or wire cable are preferably situated approximately 24 to 46 inches apart from each other. This range of spacing provides sufficient heat during daylight hours to maintain a channel 11 which is large enough to permit effective drainage of runoff water. For the zig-zag arrangement of FIG. 5, the width between peaks of the zigzag should be between approximately 24 to 46 inches.

It will be understood that other combinations, arrangements and orientations of parts may occur to persons of ordinary skill; such changes and modifications to the embodiments described above are within the spirit and scope of this invention, which is limited only by the appended claims.

I claim:

1. An ice dam remediation apparatus for use on an ice-covered roof of a building said ice dam remediation apparatus comprising:
    a photovoltaic cell;
    an electrically resistive heat-generating heating cable affixed directly to the outside surface of said roof of said building; and
    a direct electrical connection without modulation between said photovoltaic cell and said heating cable.

2. The ice dam remediation apparatus of claim 1, wherein said heating cable is affixed directly to a shaded area of said building roof which is prone to ice dam formation.

3. The ice dam remediation apparatus of claim 2, wherein said photovoltaic cell is positioned on an area of said building roof which is exposed to direct sunlight in winter.

4. The ice dam remediation apparatus of claim 3, wherein said heating cable operates at a voltage between approximately 6 volts DC and approximately 30 volts DC.

5. The ice dam remediation apparatus of claim 3, further comprising a plurality of downward-sloping drainage channels formed in said ice by said heating cable.

6. The ice dam remediation apparatus of claim 3, wherein said heating cable operates at a wattage of approximately 3 watts per lineal foot.

7. The ice dam remediation apparatus of claim 4, wherein said heating cable is arranged in a plurality of U-shaped patterns affixed directly to the outside surface of said roof near an edge of said roof in said area which is prone to ice dam formation, whereby said heating cable provides a plurality of downward-pointing lines of heating cable, each of which comprises substantially parallel lines of heating cable arranged roughly perpendicular to and over said edge of said roof.

8. The ice dam remediation apparatus of claim 4, wherein said heating cable is arranged in a zig-zag pattern affixed directly to the outside surface of said roof near an edge a said roof in said area which is prone to ice dam formation, whereby said heating cable provides plurality of downwardly-inclined lines of heating cable leading toward and over said edge of said roof.

9. The ice dam remediation apparatus of claim 7, further comprising a plurality of downward-sloping, upwardly-open drainage channels formed in said ice by said heating cable.

10. The ice dam remediation apparatus of claim 8, further comprising a plurality of downward-sloping, upwardly-open drainage channels formed in said ice by said heating cable.

11. The ice dam remediation apparatus of claim 9, wherein said heating cable operates at a wattage of approximately 3 watts per lineal foot.

12. The ice dam remediation apparatus of claim 10, wherein said heating cable operates at a wattage of approximately 3 watts per lineal foot.

* * * * *